US011254255B1

(12) United States Patent
Jones

(10) Patent No.: US 11,254,255 B1
(45) Date of Patent: Feb. 22, 2022

(54) TOW TRUCK SUPPORT ASSEMBLY

(71) Applicant: Jessie Jones, Denver, CO (US)

(72) Inventor: Jessie Jones, Denver, CO (US)

( * ) Notice: Subject to any disclaimer, the term of this patent is extended or adjusted under 35 U.S.C. 154(b) by 0 days.

(21) Appl. No.: 17/362,217

(22) Filed: Jun. 29, 2021

(51) Int. Cl.
| | |
|---|---|
| *B60P 3/075* | (2006.01) |
| *B60D 1/145* | (2006.01) |
| *B60D 1/18* | (2006.01) |
| *B60D 1/04* | (2006.01) |
| *B60D 1/42* | (2006.01) |
| *B60D 1/00* | (2006.01) |

(52) U.S. Cl.
CPC ............ *B60P 3/075* (2013.01); *B60D 1/04* (2013.01); *B60D 1/145* (2013.01); *B60D 1/187* (2013.01); *B60D 1/42* (2013.01); *B60D 2001/003* (2013.01)

(58) Field of Classification Search
CPC ......... B60P 3/075; B60D 1/145; B60D 1/155; B60D 1/187; B60D 2001/003
See application file for complete search history.

(56) References Cited

U.S. PATENT DOCUMENTS

| | | | |
|---|---|---|---|
| 4,243,243 A | 1/1981 | Edminsten | |
| 4,383,807 A * | 5/1983 | Bubik | B60P 3/125 254/326 |
| 4,679,978 A * | 7/1987 | Holmes | B60P 3/125 414/563 |
| 4,836,737 A * | 6/1989 | Holmes | B60P 3/125 414/563 |
| 4,875,269 A * | 10/1989 | Crist | B60P 3/125 29/401.1 |
| 4,958,980 A * | 9/1990 | Holmes | B60P 3/125 280/402 |
| 5,039,272 A * | 8/1991 | Holmes | B60P 3/125 414/563 |
| 5,123,802 A * | 6/1992 | Bell | B60P 3/122 224/401 |
| 5,228,712 A * | 7/1993 | Speier | B60D 1/06 280/401 |
| 5,326,202 A | 7/1994 | Stubbs | |

(Continued)

OTHER PUBLICATIONS

"Magneta Trailers—Motorcycle Caddy Towing Device," Magneta Trailers, http://canoekayaktrailers.com/motorcycle-towing-devise/ [Date Accessed: Jan. 26, 2021].

*Primary Examiner* — Tony H Winner
*Assistant Examiner* — Michael R Stabley
(74) *Attorney, Agent, or Firm* — Houda El-Jarrah; Bold IP, PLLC

(57) ABSTRACT

A support beam for stabilizing a motorcycle on the wheel lift of a tow truck is provided. The support beam includes a mount that positions the beam horizontally on a rear portion of the tow truck at a level generally equal to the level of the motorcycle's handlebars when the motorcycle is resting on the wheel lift. The beam includes a first end attachable to the motorcycle's left handlebar using a left strap, and a second end attachable to the motorcycle's right handlebar using a right strap. With the motorcycle resting on the tow truck's wheel lift, and the beam configured to provide support to the motorcycle's handlebars, the motorcycle is secured to the wheel lift, stabilized, and able to be towed. In some embodiments, the mount is designed to be received into a wheel lift cable guide through-hole thereby securing the beam to the wheel lift.

19 Claims, 12 Drawing Sheets

(56) References Cited

U.S. PATENT DOCUMENTS

| | | | |
|---|---|---|---|
| 5,647,719 A | 7/1997 | Bowlen | |
| 5,846,047 A * | 12/1998 | Riekki | B60P 3/122 |
| | | | 414/494 |
| 6,099,232 A * | 8/2000 | Dixon | B60P 1/14 |
| | | | 224/310 |
| 6,186,727 B1 | 2/2001 | Hamilton | |
| 6,354,777 B1 * | 3/2002 | Riekki | B60P 3/122 |
| | | | 410/12 |
| 6,698,994 B2 * | 3/2004 | Barrett | B60P 3/07 |
| | | | 414/462 |
| 8,016,313 B2 | 9/2011 | Gilels et al. | |
| 8,382,142 B2 * | 2/2013 | Edmondson | B60P 3/127 |
| | | | 280/402 |
| 2001/0031192 A1 * | 10/2001 | Hamilton | B60P 3/125 |
| | | | 414/426 |
| 2004/0076498 A1 * | 4/2004 | Thompson | B60P 3/122 |
| | | | 414/462 |
| 2005/0111948 A1 * | 5/2005 | Nolasco | B60P 3/125 |
| | | | 414/563 |
| 2014/0252285 A1 * | 9/2014 | Genoe | B66C 23/44 |
| | | | 254/280 |

* cited by examiner

TOW TRUCK SUPPORT ASSEMBLY

FIELD OF THE INVENTION

This invention relates to towing mechanisms, including a support assembly for towing a motorcycle using a conventional tow truck.

BACKGROUND

Conventional tow trucks equipped with wheel lifts are designed to tow vehicles with two front wheels and two rear wheels. The conventional wheel lift is designed to support the front of an automobile's chassis from below while lifting the vehicle's front two wheels off the ground and leaving the vehicle's rear two wheels grounded. Because the rear two wheels remain grounded, the automobile is stable and may be towed by the truck.

However, because motorcycles only include one front wheel and one rear wheel, conventional wheel lifts are not designed to provide adequate stability to a motorcycle for towing. Accordingly, conventional tow trucks equipped with conventional wheel lifts cannot be used to tow motorcycles.

Accordingly, there is a need for a support assembly that may be used with a conventional wheel lift and that provides stability to motorcycles for towing.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

SUMMARY

Figure 1:
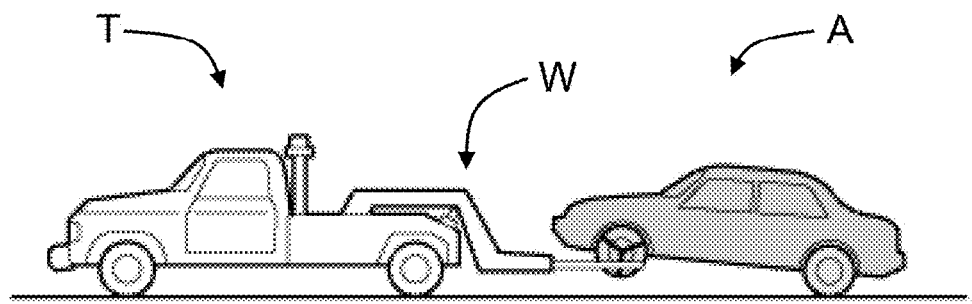
FIG. 1 shows aspects of a conventional tow truck using a conventional wheel lift to tow an automobile according to exemplary embodiments hereof.

According to one aspect, one or more embodiments are provided below for a mobile device accessory comprising a support assembly for use with a tow truck, the tow truck including a wheel lift and a cable guide configured with the wheel lift and including a through-hole, the support assembly comprising an elongate member with a first end and a second end, a mount attached to the elongate member between the first end and the second end, the mount comprising a body adapted to be received into the through-hole, a first line attached to the first end and adapted to extend between the first end and an object resting on the wheel lift, and a second line attached to the second end and adapted to extend between the second end and the object resting on the wheel lift.

In another embodiment, the mount's body includes a front end, a back end, and an opening extending between the front end and the back end.

In another embodiment, the mount's body includes a side wall extending between the front end and the back end, the side wall including a slot that passes from outside the body to the opening.

In another embodiment, the slot extends from the front end to the back end.

In another embodiment, the elongate member includes a front side and a back side each extending between the first end and the second end, and a cutout extending from the front side to the back side and adjacent to the slot.

In another embodiment, the elongate member includes a top and a bottom, and the cutout extends from the bottom towards the top.

In another embodiment, the cutout extends perpendicular to the bottom.

In another embodiment, the slot is aligned with the cutout.

In another embodiment, the through-hole includes an inner diameter and the mount's body includes an outer diameter, wherein the outer diameter corresponds to the inner diameter.

In another embodiment, the mount's body is tubular.

In another embodiment, a cross-section of the mount's body is shaped as at least one of a circle, an oval, a triangle, a square, a rectangle, a pentagon, a hexagon, an octagon, a nonagon, and a decagon.

In another embodiment, the mount is located at a position midway between the first end and the second end.

In another embodiment, the mount extends perpendicularly away from the elongate member.

In another embodiment, the first line and/or the second line includes a line length adjustment mechanism.

In another embodiment, the first end is configured with a first hook and the first line is attached to the first hook, and/or the second end is configured with a second hook and the second line is attached to the second hook.

In another embodiment, the first and/or second line includes at least one of a strap, webbing, a cable, a chain, and a rope.

In another embodiment, the object includes a motorcycle including a left handlebar and a right handlebar, and the first line is attachable to the left handlebar and the second line is attachable to the right handlebar.

According to another aspect, one or more embodiments are provided below for a support assembly for use with a tow truck, the tow truck including a front end and a wheel lift including an opening facing the front end, the support assembly comprising an elongate member with a first end and a second end, a mount attached to the elongate member between the first end and the second end, the mount comprising a body adapted to be received into the opening, a first line attached to the first end and adapted to extend between the first end and an object resting on the wheel lift, and a second line attached to the second end and adapted to extend between the second end and the object resting on the wheel lift.

In another embodiment, the object includes a motorcycle including a left handlebar and a right handlebar, and the first line is attachable to the left handlebar and the second line is attachable to the right handlebar.

Other aspects and advantages of the invention will be apparent from the following description and the appended claims.

DETAILED DESCRIPTION OF EXEMPLARY EMBODIMENTS

In general, the tow truck support assembly according to exemplary embodiments hereof provides a support assembly for stabilizing a motorcycle or other object(s) onto the wheel lift of a conventional tow truck, including a tow truck which is typically suited for transporting four wheeled vehicles. In some embodiments, the assembly includes a horizontal support beam attachable to a rear portion of the tow truck. The beam includes a first end and a second end, with the first end adapted to provide stability to a motorcycle's left handlebar and the second end adapted to provide stability to the motorcycle's right handlebar. With the motorcycle resting on the tow truck's wheel lift, and the beam configured to provide support to the motorcycle's handlebars, the motorcycle is secured to the wheel lift, stabilized, and able to be towed. In some embodiments, the support beam is configurable with a rear portion of the tow truck that places the beam at a level generally even with the motorcycle's handlebars (when the motorcycle is resting on the tow truck's wheel lift). In some embodiments, the first and second ends of the beam may be secured to the left and right handlebars, respectively, using straps, cables, ropes, or other types of lines and/or attachment mechanisms.

For the purposes of this specification, the support assembly will be described primarily in relation to providing support and stability to a motorcycle while being towed on a conventional tow truck. However, a person of ordinary skill in the art will understand that the assembly may be used to provide support and stability to other objects resting on a tow truck's wheel lift (e.g., bicycles, boats, scooters, crates, pallets, and/or other objects) and that the scope of the assembly is not limited in any way by the object(s) that it may support.

In order to provide additional insight into the stability beam assembly, as described according to one or more non-limiting embodiments, and its benefits, some general background information regarding a conventional tow truck and wheel lift is provided below and described in conjunction with the Figures.

FIG. 1 shows a conventional tow truck T in the act of towing a conventional automobile A. The tow truck T includes a wheel lift W and the automobile A includes a chassis with two front wheels and two rear wheels. As shown, the wheel lift W is adapted to support the automobile's chassis from below while lifting the front two wheels off the ground. Because the rear two wheels remain grounded, the automobile A is stable and may be towed by the truck T.

Figure 2:
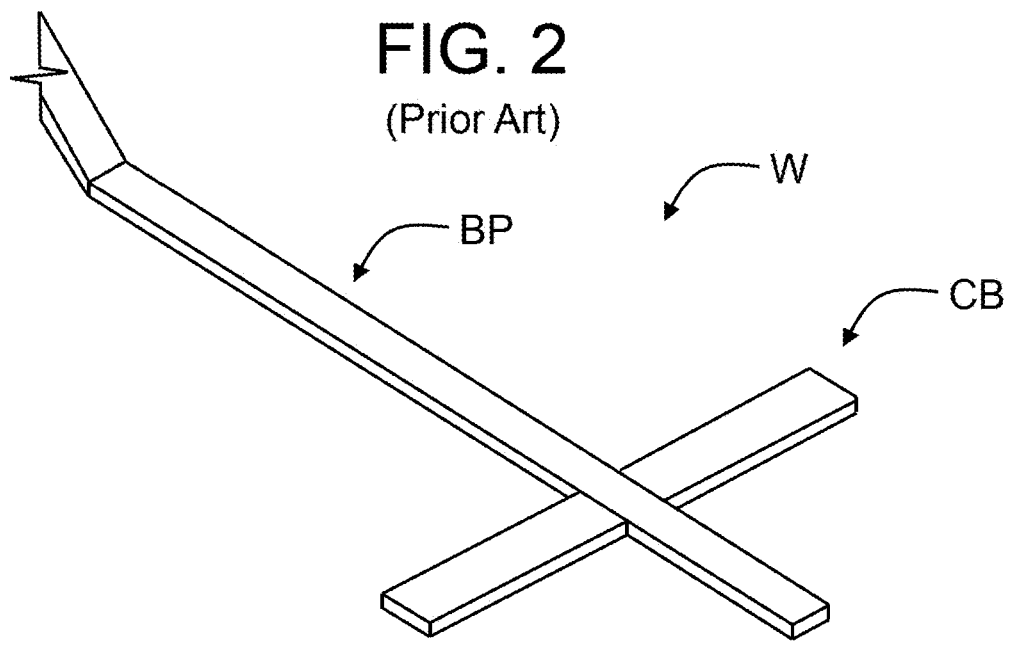
FIG. 2 shows aspects of a conventional wheel lift according to exemplary embodiments hereof.

FIG. 2 shows a simplified schematic of the tow truck's wheel lift W. The wheel lift W includes an elongate base portion BP with a crossbar CB. When in use, the wheel lift W is positioned under the chassis of the automobile A with the crossbar positioned behind the automobile's front two tires thereby providing lateral support to the chassis. In this configuration, the tow truck T may apply a lift force to the wheel lift W thereby lifting the wheel lift W and the automobile vertically upward. Once the front two tires of the automobile A are sufficiently lifted above the ground, the automobile A may be towed. It is understood that the wheel lift W may include additional elements, some of which may be described in other sections.

Figure 3:
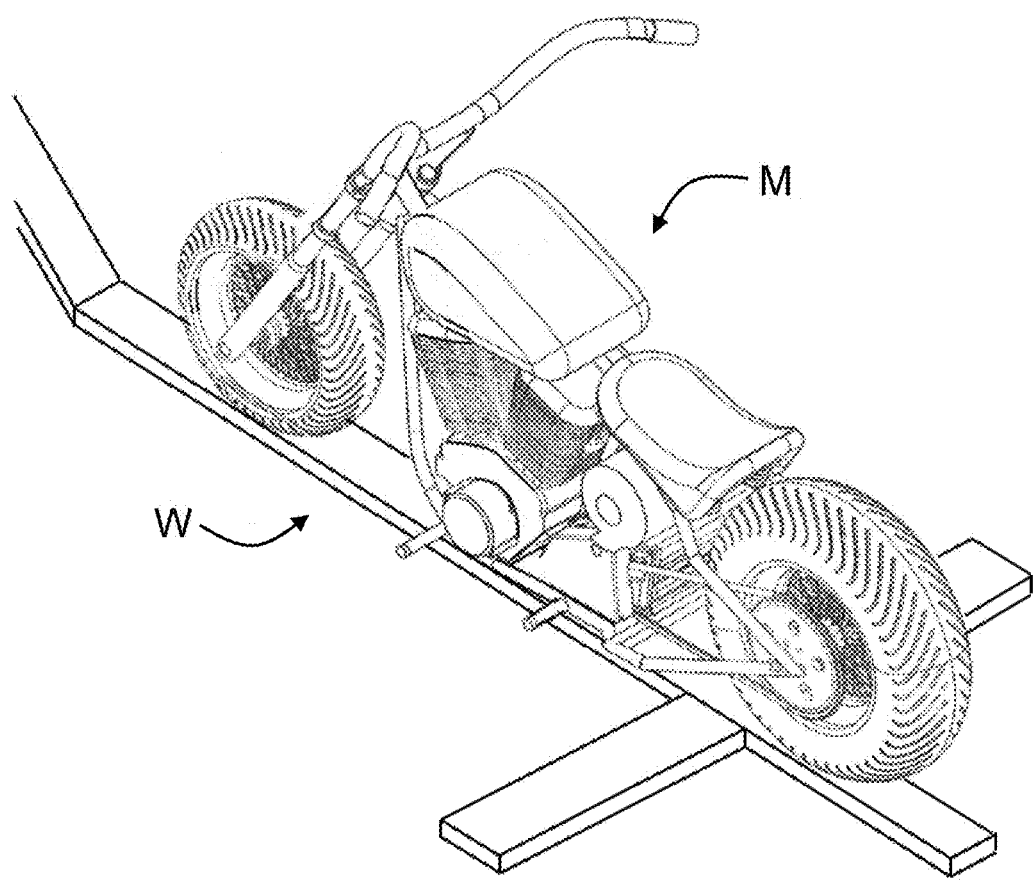
FIG. 3 shows aspects of a motorcycle resting on a conventional wheel lift according to exemplary embodiments hereof.

FIG. 3 shows a motorcycle M resting on the simplified version of the wheel lift W of FIG. 2. Because the motorcycle M includes only one front wheel and only one rear wheel, it can be seen that the wheel lift W is not configurable to provide stabilizing support to the motorcycle M, and as such, is not designed to tow the motorcycle M.

Figure 4:
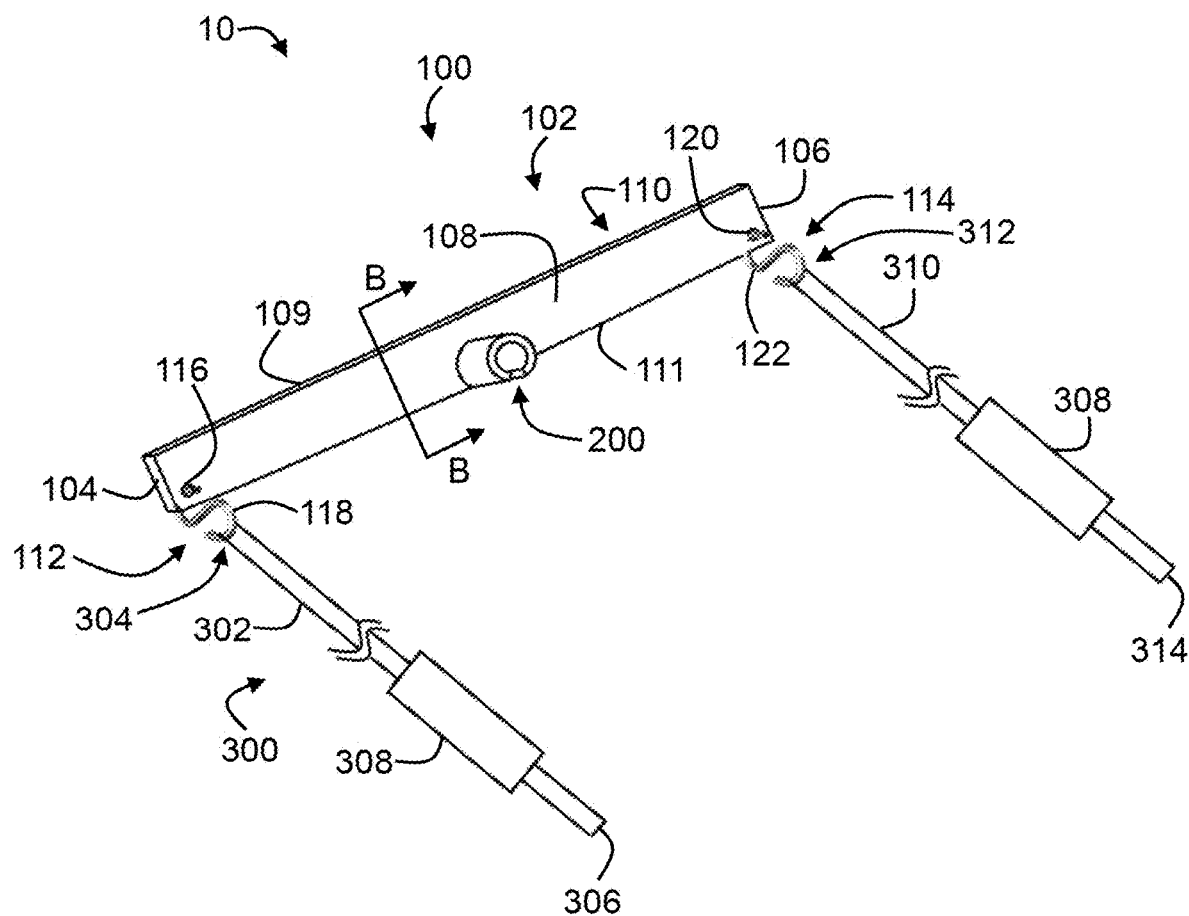
FIG. 4 shows aspects of a support assembly according to exemplary embodiments hereof.

As described herein, the support assembly 10, as shown in FIG. 4, according to exemplary embodiments hereof provides a mechanism for enabling a tow truck T equipped with a wheel lift W to tow a motorcycle M.

In one exemplary embodiment hereof as shown in FIG. 4, the support assembly 10 includes a beam 100, a mount 200, and a strap assembly 300. In general, the mount 200 secures the beam 100 to the tow truck T and the strap assembly 300 secures the beam 100 to a motorcycle M being towed. The assembly 10 also may include other elements and components as necessary to perform its desired functionalities as described herein or otherwise.

Beam 100

In some embodiments as shown in FIG. 4, the beam 100 includes an elongate member 102 with a first end 104 and a second end 106. The elongate member 102 also includes a front side 108 and a back side 110, a top 109, and a bottom 111.

The elongate member 102 also includes a first attachment mechanism 112 configured towards its first end 104 and a second attachment mechanism 114 configured towards it second end 106. As will be described herein, the first attachment mechanism 112 may be configured to attach a strap between the member's first end 104 and the left handlebar of a motorcycle, and the second attachment mechanism 114 may be configured to attach a strap between the member's second end 106 and the right handlebar of the motorcycle.

In one embodiment as shown, the first attachment mechanism 112 includes a first hole 116 that passes through the elongate member 102 from its front side 108 to its back side 110, with the hole 116 coupled with a first hook 118. The second attachment mechanism 114 includes a second hole 120 that passes through the member 102 from its front side 108 to its back side 110, with the hole 120 coupled with a second hook 122. The first and second hooks 118, 122 may include S-hooks (as shown), carabiners, rings, latches, loops, any other type of suitable hooks and/or attachment mechanisms and any combinations thereof. In other embodiments, the first and second attachment mechanisms 112, 114 include loops bolted or welded onto the front surface 108 of the member 102. It is understood that any suitable type of attachment mechanisms may be used and that the scope of the beam 100 is not limited in any way by the types of attachment mechanisms it may include.

Figure 5:
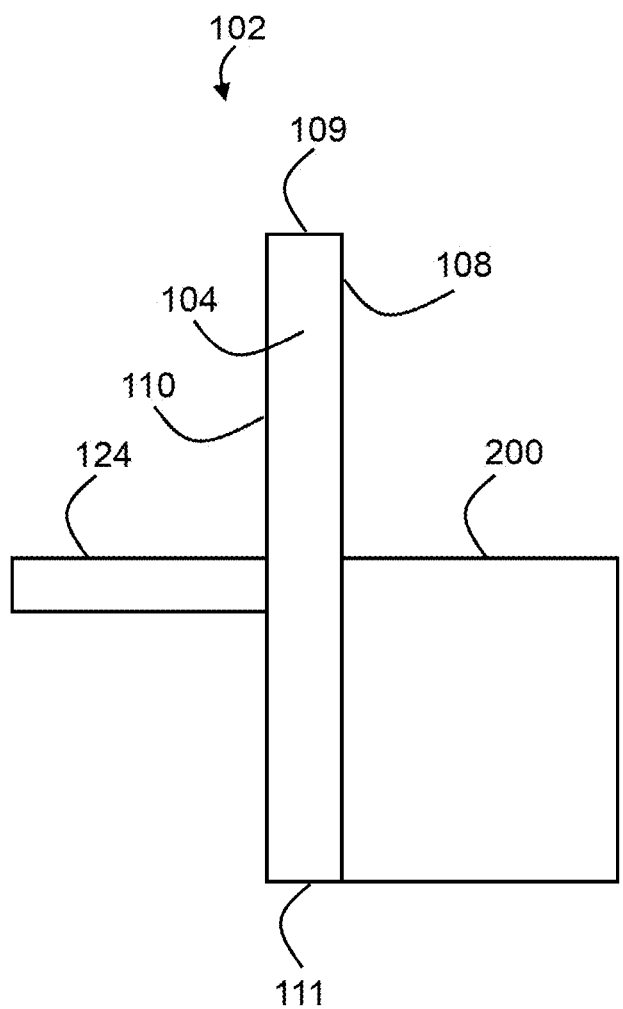
FIG. 5 is a cross-sectional view taken along lines B-B shown in FIG. 4 that shows aspects an elongate member, a reinforcement rib, and a mount according to exemplary embodiments hereof.

In some embodiments, the beam 100 may comprise metal (e.g., steel, aluminum, iron, and/or other types of metal), and/or other types of suitable materials (e.g., carbon composites). In some embodiments, the elongate member 102 includes a rectangular plate, a dowel, a pipe, and/or any other suitable type of elongate member. In some embodiments, the elongate member 102 includes one or more reinforcement structures adapted to provide additional rigidity and strength to the member 102. For example, the member 102 may include an elongate rib 124, as shown in FIG. 5, configured perpendicular with its back side 110, positioned about midway between the member's bottom 111 and top 109 and extending from the member's first end 104 to its second end 106 (and/or along any portions thereof). This is shown in FIG. 5, which is a cross-sectional view taken from the perspective of the cutlines B-B of FIG. 4. The reinforcement rib 124 may be welded, bolted, and/or attached to the elongate member 102 using any suitable attachment methods. It is understood that the elongate member 102 may be provided in any suitable form, shape, and/or architecture and that the scope of the beam 100 is not limited in any way by the forms or numbers of any elongate members used.

In some embodiments, the elongate member 102 may comprise a ¼" thick steel plate approximately 3" wide and about 24" to 48" long (from its first end 104 to its second end 106 as shown in FIG. 4), and preferably about 36" long. In some embodiments, the reinforcement rib 124 may comprise a ¼" thick steel plate approximately 1" wide and 36" long (extending from the member's first end 104 to its second end 106). However, it is understood that the elongate member 102 and/or the reinforcement rib 124 may comprise any other suitable type of structure with any suitable dimensions.

Mount 200

Figure 6:
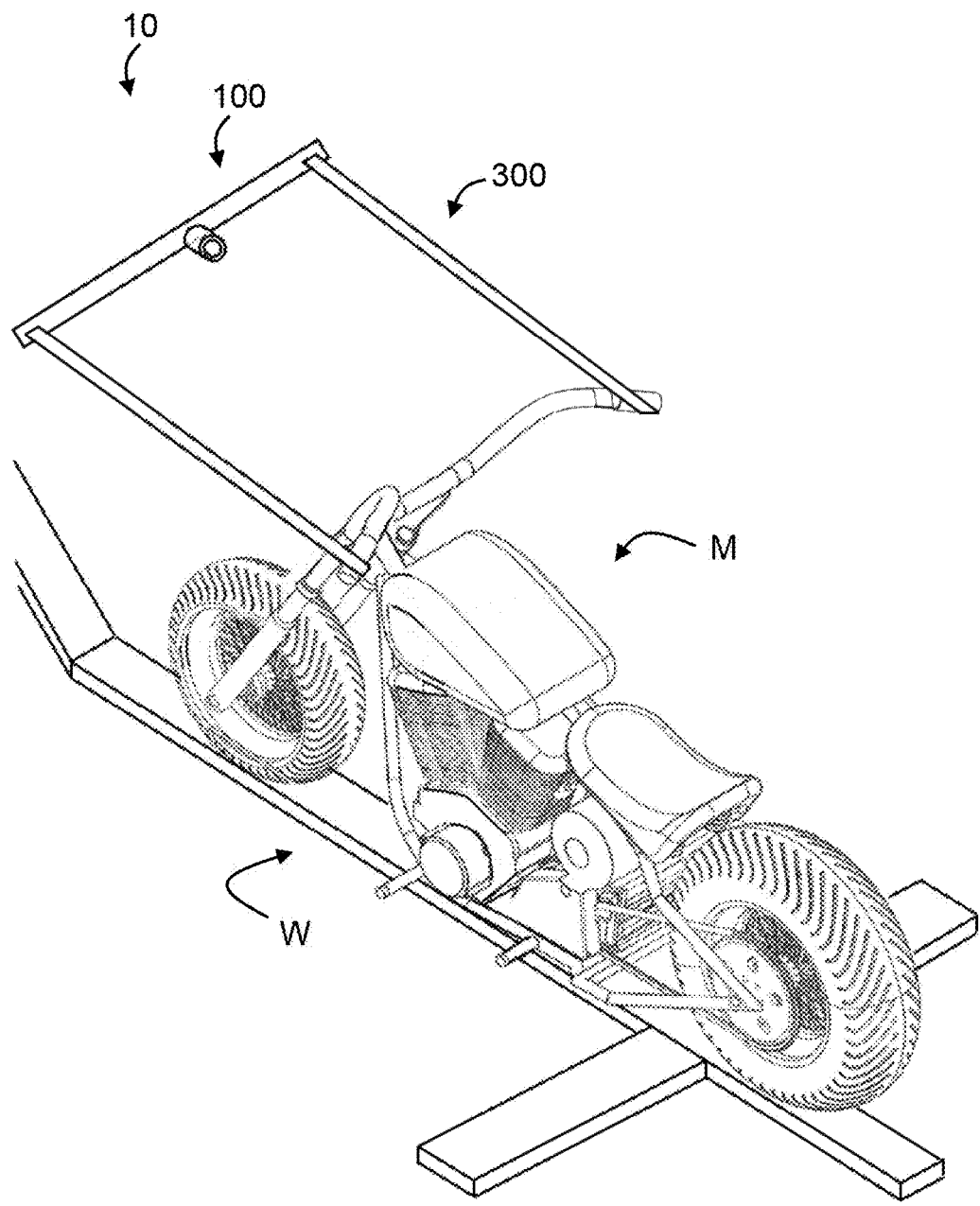
FIG. 6 shows aspects of a motorcycle resting on a conventional wheel lift and a support assembly according to exemplary embodiments hereof.

In some embodiments, the beam 100 includes a mount 200 adapted to secure the beam 100 to a portion of a tow truck T. As will be described in other sections, the mount 200 is adapted to secure the beam 100 to a rear portion of the tow truck T that positions the beam 100 at a level generally even with the motorcycle's handlebars when the motorcycle is resting on the truck's wheel lift. It is understood that the level of the motorcycle may vary slightly when the wheel lift W is raised and/or lowered such that the beam 100 may not be even with the level of the motorcycle's handlebars at all times. For example, the beam 100 may be at a slightly higher elevation compared to the handlebars when the wheel lift W is in a lower position, and/or slightly lower in elevation when the wheel lift W is in an upper position. However, it is preferable that the level of the beam 100 be generally even with the level of the handlebars when required as shown in FIG. 6. The beam 100 is coupled with the motorcycle M using a strap assembly 300 as described in other sections.

In some embodiments, the mount 200 is configured with the beam 100 and is adapted to secure the beam 100 to a portion of the tow truck T. In some embodiments as shown in FIG. 4, the mount 200 is attached to the beam's front side 108 about midway between the elongate member's first end 104 and its second end 106 and towards its bottom 111. However, it is understood that the mount 200 may be configured at any suitable location on the beam 100. The portion of the truck T to which the mount 200 is adapted to attach will be described in other sections below.

Figure 7:
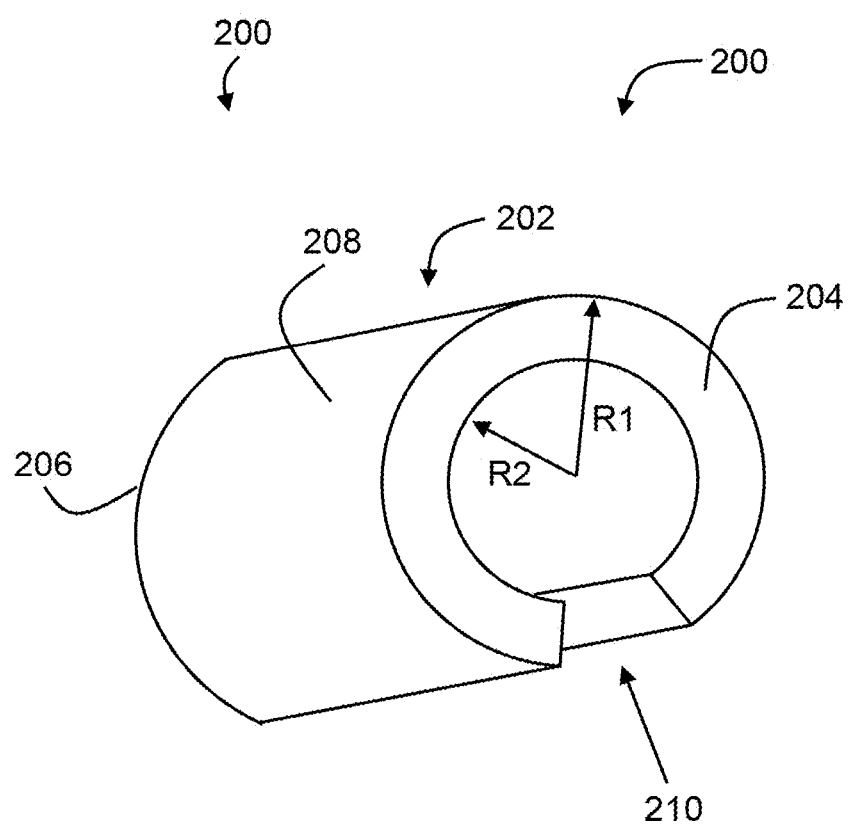
FIG. 7 shows aspects of a mount according to exemplary embodiments hereof.

In some embodiments as shown in FIG. 7, the mount 200 includes a body 202 with a front side 204, a back side 206 and one or more side walls 208 extending between the front side 204 and back side 206. In some embodiments, the body 202 includes a hollow cylinder (e.g., a tube) with a generally circular or oval shaped cross-section with an outer radius R1 and an inner radius of R2. In other embodiments, the body's cross-sectional shape may be triangular, square, rectangular, pentagonal, hexagonal, octagonal, nonagonal, decagonal, and/or any other type of shape.

In some embodiments, the body 202 may include a slot 210 in its sidewall 208 extending from the front side 204 to the back side 206. Accordingly, the slot 210 forms a gap in the side wall 208 that passes from outside the mount's body 202 to inside the body's hollow inner portion. This is best shown in FIGS. 7-8.

In some embodiments, the mount 200 may be welded, bolted, and/or attached to the beam's front side 108 using any suitable attachment methods. When attached, it is preferable that the body 202 extend generally perpendicularly away from the front side 108 with the side opening of the mount's slot 210 generally aligned with (i.e., generally flush with) the elongate member's bottom 111 as shown in FIG. 8.

Figure 8:
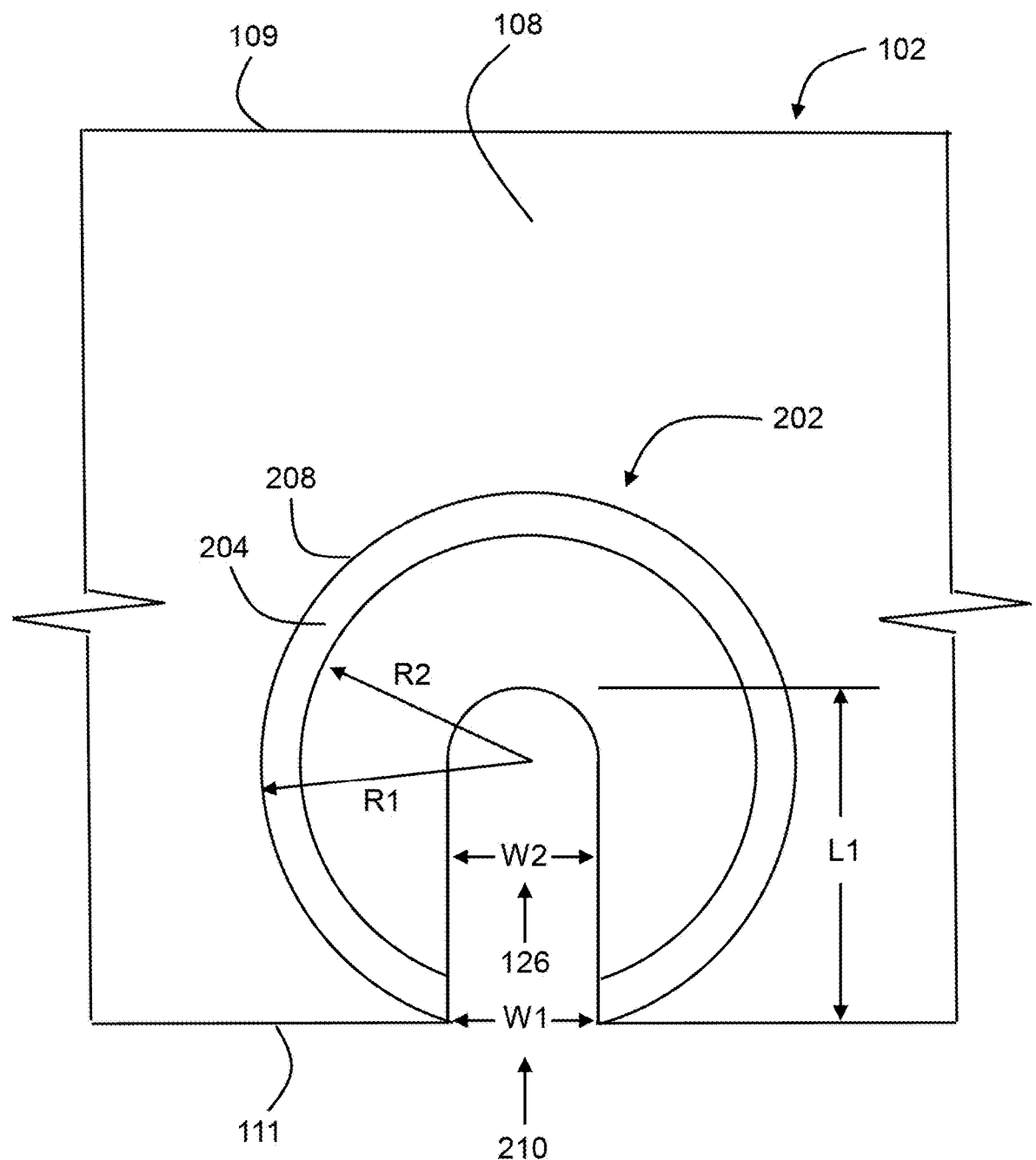
FIG. 8 shows aspects of a mount and an elongate member according to exemplary embodiments hereof.

FIG. 8 shows a frontal view of the mount 200 attached to a portion of the elongate member 102 of the support assembly 10 as shown in FIG. 4. In some embodiments as shown in FIG. 8, with the mount 200 configured with the front side 108 of the elongate member 102, the elongate member 102 includes a slot or cutout 126 in its front side 108 in the area of the mount's slot 210. In some embodiments, the cutout 126 extends perpendicular to the bottom 111 of the elongate member 102. The width W1 of the member's cutout 126 preferably corresponds to the width W2 of the mount's slot 210 as shown.

In some embodiments, the member's cutout 126 extends from its bottom 111 towards its top 109 a length L1, with L1 preferably equaling a distance of about R1 to twice R1 (with R1 being the outer radius of the mount 200). The cutout 126 may include rounded corners at its inner end but this may not be necessary in other non-limiting embodiments.

In some embodiments, the width W1 of the cutout 126 (and preferably the width W2 of the slot 210) is about ½" to 1", and preferably about 9/16". In addition, the length L1 of the cutout 126 is about 1" to 1¾", and preferably about 1⅜". The outer radius R1 of the mount's body 202 is about ½" to 1", and preferably about 27/32", and the mount's inner radius R2 is about ½" to 1", and preferably about 15/32". In some embodiments, the mount's body 202 extends about 2" to 3" away from the elongate member 102's front side 108, and preferably about 2¼" away from the elongate member 102's front side 108.

Strap Assembly 300

As shown in FIG. 4, in some embodiments, the strap assembly 300 includes one or more straps 302 adapted to extend between the beam 100 and the handlebars of a motorcycle M. It is understood that the one or more straps 302 may include straps, webbing, cables, chains, ropes, any other type of line(s) and any combinations thereof. In some embodiments, the strap assembly 300 includes a first strap 302 with a first end 304 attachable to the first attachment mechanism 112 and a second end 306 attachable to the left handlebar of a motorcycle M. The first strap 302 also may include a strap length adjustment mechanism 308 (e.g., a rachet device) that may be used to adjust the length of the strap 302 in order to tighten and/or loosen the strap 302 during setup and use. In one example, the strap's first end 304 may loop through the first hook 118 at the first end 104 of the elongate member 102, and the strap's second end 306 may loop around the distal end of the motorcycle M's left handlebar. The first strap 302 may then be tightened using the length adjustment mechanism 308.

In addition, in some embodiments, the strap assembly 300 includes a second strap 310 with a first end 312 attachable to the second attachment mechanism 114 and a second end 314 attachable to the right handlebar of a motorcycle. The second strap 310 also may include a strap length adjustment mechanism 308 (e.g., a rachet device) that may be used to adjust the length of the strap 310 in order to tighten and/or loosen the strap during setup and use. In one example, the strap's first end 312 may loop through the second hook 122 at the second end 106 of the elongate member 102, and the strap's second end 306 may loop around the distal end of the motorcycle M's right handlebar. The second strap 310 may then be tightened using the length adjustment mechanism 308.

It is understood that the strap configuration examples described above are meant for demonstration and that any strap configuration as known in the art may be used to attach the first strap 302 between the first end 104 of the elongate member 102 and the distal end of the motorcycle's left handlebar, and the second strap 310 between the second end 106 of the elongate member 102 and the distal end of the motorcycle's right handlebar.

Securing the Beam 100 and the Motorcycle

Figure 9:
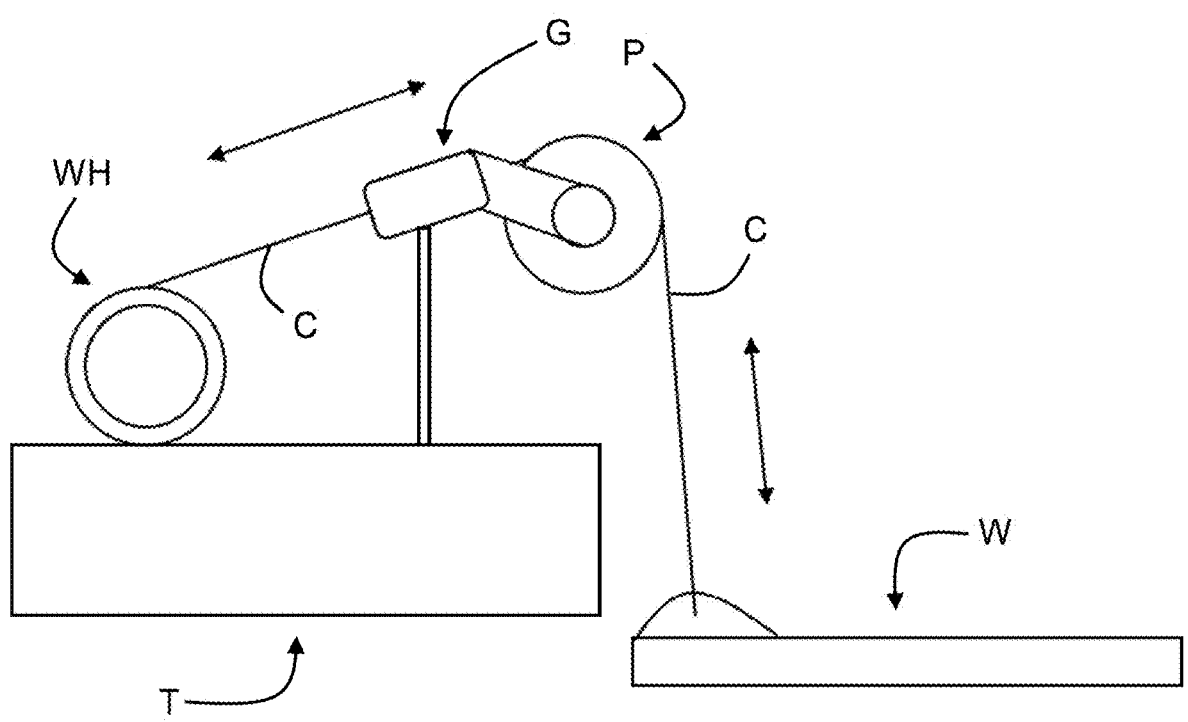
FIG. 9 shows aspects of a tow truck, a winch, a cable, a pulley assembly, and a wheel lift according to exemplary embodiments hereof.

As is known in the art, a conventional tow truck T including a wheel lift W also includes a system for lowering and raising the wheel lift W during use. In this way, the wheel lift W may be lowered to rest on the ground to be properly positioned beneath the front of an automobile, and then raised to lift the front portion of the automobile off the ground for subsequent towing of the vehicle. In one simplified example as shown in FIG. 9, the tow truck T includes a cable assembly including a cable C with a first end attached to the wheel lift W and a second end attached to a winch WH for extending and retracting the cable C. The cable assembly also includes a pulley assembly including a pulley P adapted to translate the cable C from the winch to a generally vertical orientation at the wheel lift W. In this way, as the winch WH releases the cable C, the wheel lift W is lowered, and as the winch WH retracts the cable C the wheel lift W is raised. It is understood that the schematic shown in FIG. 9 is a simplified representation of the above described and that the tow truck T may include other elements not mentioned.

Figure 10:
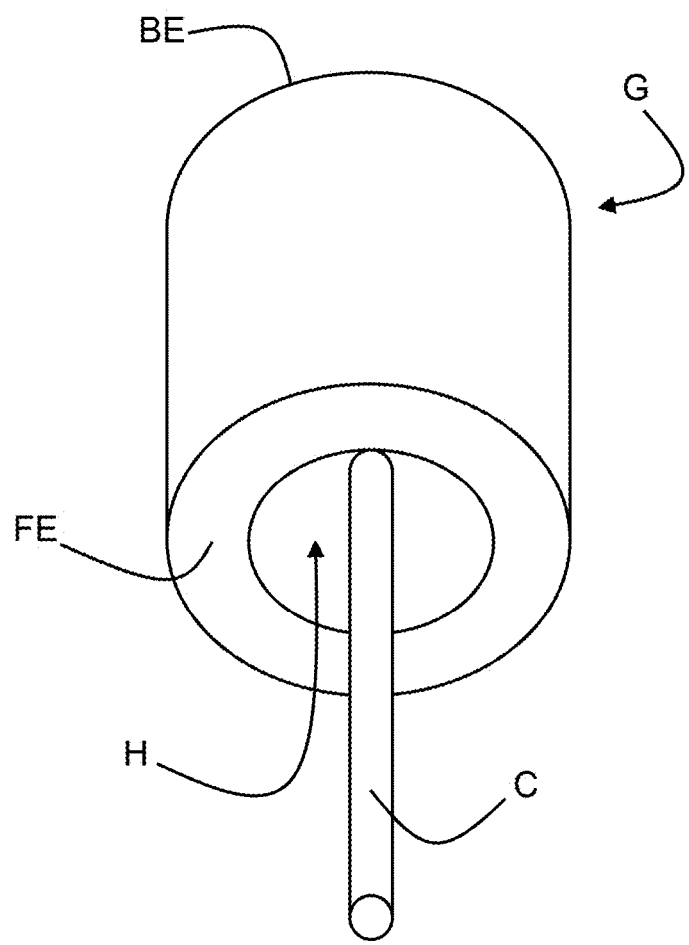
FIG. 10 shows aspects of a cable guide according to exemplary embodiments hereof.

As shown in FIG. 9, the truck's pulley assembly also includes a cable guide G that receives the cable C from the winch WH and guides it onto the pulley P. As shown in FIG. 10, the cable guide G includes a generally cylindrical body (e.g., a tube) that is oriented longitudinally along the cable C adjacent the pulley P and with a through-hole H (i.e., an opening) that passes through the guide G from its front end FE to its back end BE. The cable C passes through the through-hole H and is guided onto the pulley P. In some embodiments, the truck's winch, cable assembly, pulley assembly, and cable guide G are incorporated as elements of the wheel lift W.

Figure 11:
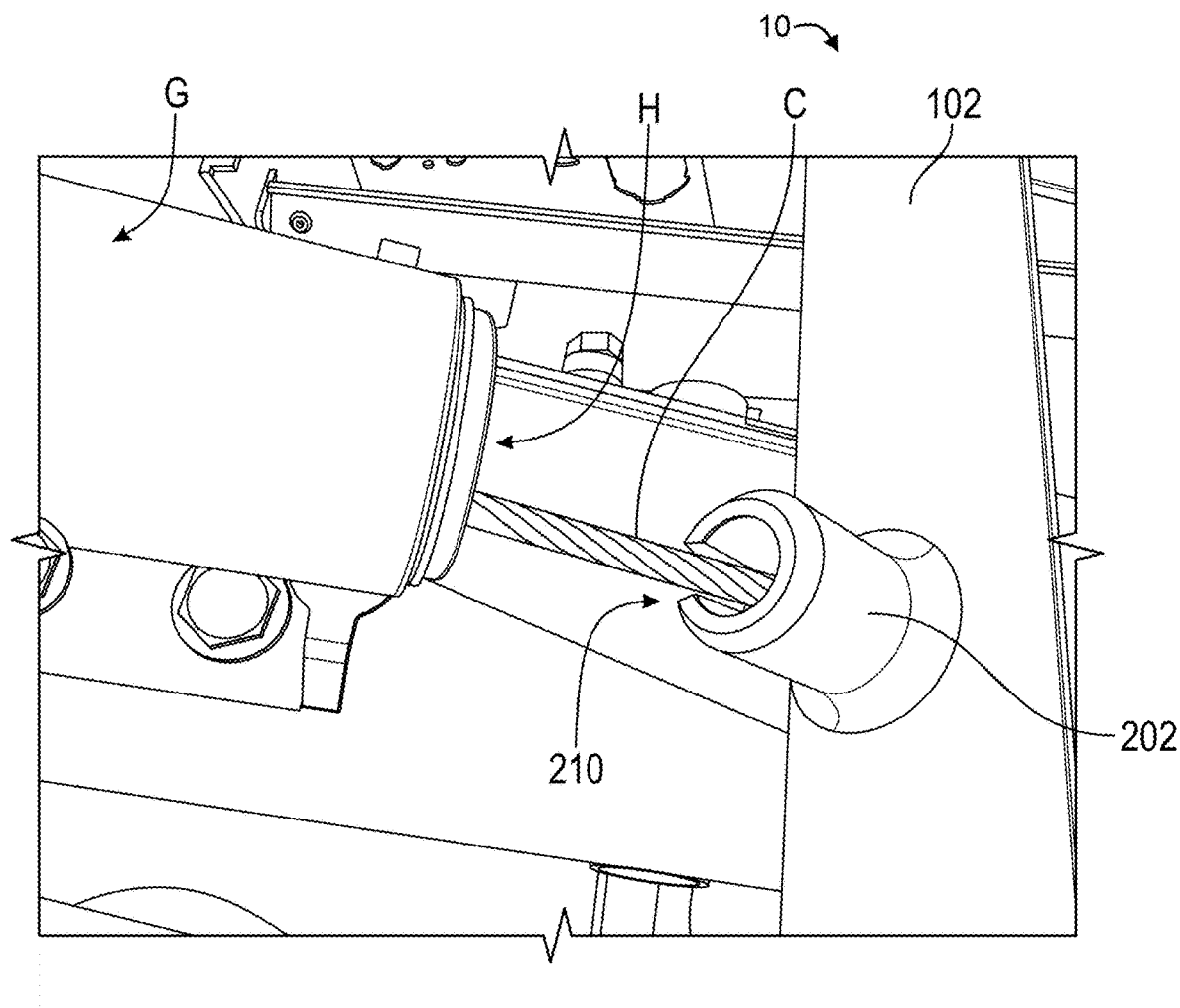
FIG. 11 shows aspects of a cable guide, a mount, and an elongate member according to exemplary embodiments hereof.
Figure 12:
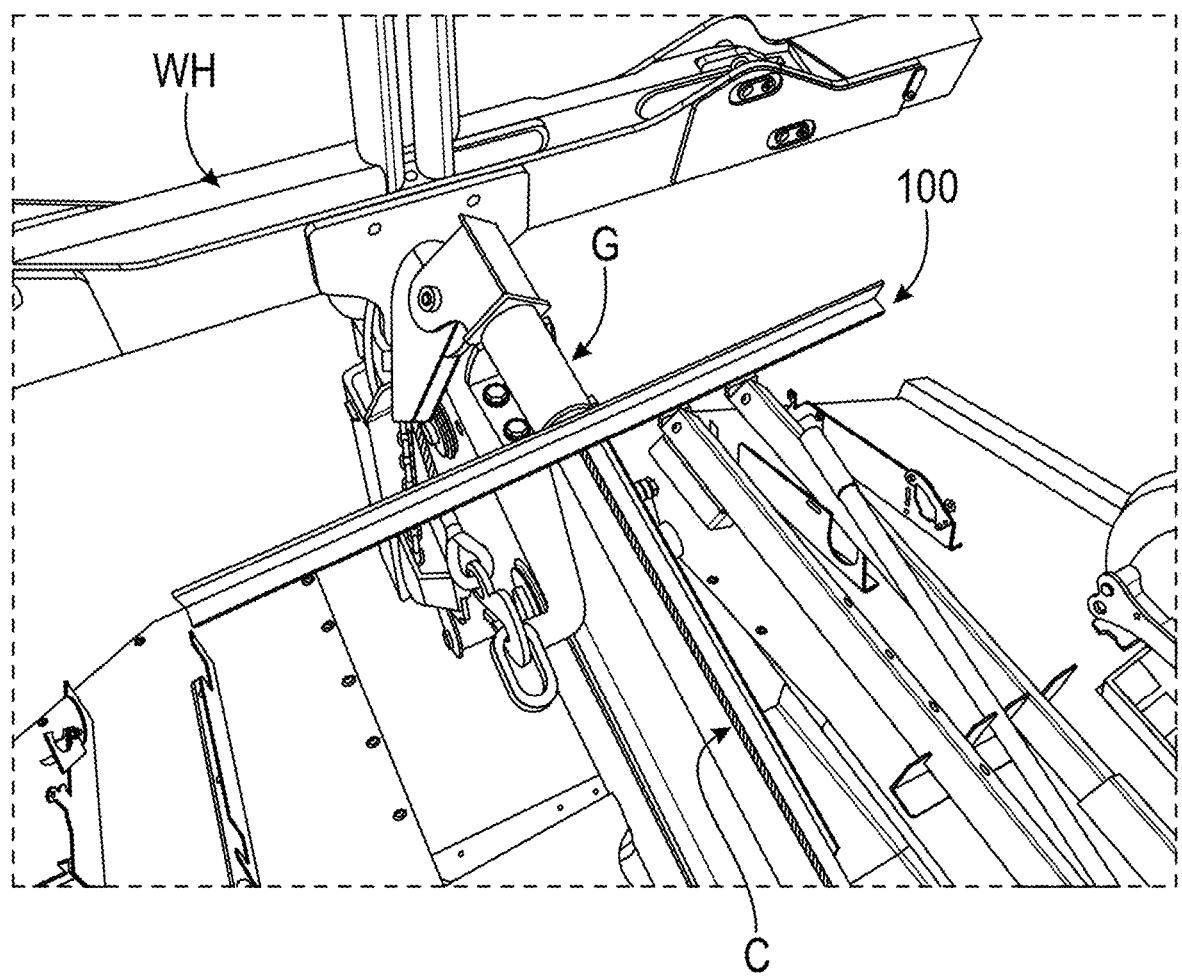
FIG. 12 shows aspects of a cable guide, a mount, and an elongate member according to exemplary embodiments hereof.

In some embodiments, the mount 200 is adapted to be received into the front end of the guide's through-hole H and be secured therein. Accordingly, the outer diameter of the mount's body 202 (with the outer diameter equaling twice the mount's outer radius R1) is designed to be slightly less than the inner diameter of the through-hole H. In this way, the mount's body 202 may fit removably snug within the through-hole H. During the configuration process, the cable C is received through the mount body's slot 210, through the elongate member's cutout 126, and into the hollow portion of the mount's body 202 as shown in FIG. 11. The mount's body 202 is then received into the through-hole H and the elongate member 102 is abutted transverse the front side of the cable guide G. In this way, the beam 100 is held in place, the cable C passes through the mount's body 202 and into the cable guide G, and the beam 100 does not obstruct the cable C and/or the operation of the wheel lift W, as shown in FIG. 9. This configuration is shown in FIG. 12. FIG. 12 shows the support assembly 10 attached to the tow truck T via the cable C and the cable guide G in the manner described above.

Figure 13:
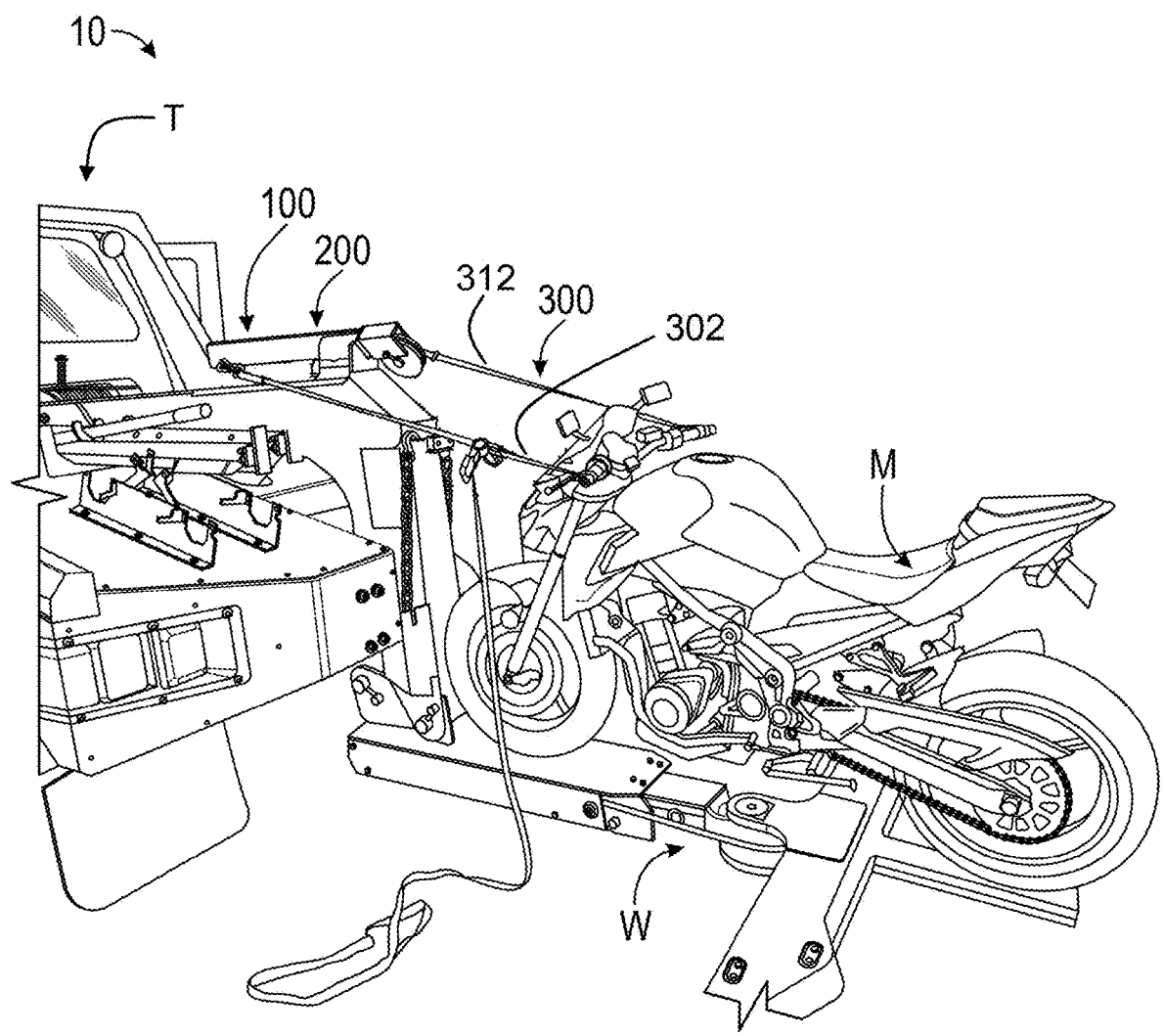
FIG. 13 shows aspects of a motorcycle configured with a support assembly and a wheel lift according to exemplary embodiments hereof.

Once the beam 100 of the support assembly 10 is secured to the cable guide G of the truck T, the strap assembly 300 may be configured between the elongate member 102 and the left and right handlebars of the motorcycle M as described above. This results in the arrangement as shown in FIG. 13. In this configuration, the first strap 302 provides first tensional forces to the left handlebar and the second strap 310 provides second tensional forces to the right handlebar, with the first and second tensional forces balancing one another and thereby stabilizing the motorcycle. It may be preferable that the front of the motorcycle's front wheel abut against a portion of the wheel lift W to provide a stop to the motorcycle when the first and second straps 302, 310 provide the tensional forces. In this way, the straps 302, 310 may be tightened and the motorcycle may be held secure.

It is understood that any aspect and/or element of any of the embodiments described herein or otherwise may be combined in any way with any other aspect and/or element of any other embodiment to form additional embodiments of the support assembly 10, all of which are within the scope of the support assembly 10.

Those of ordinary skill in the art will appreciate and understand, upon reading this description, that embodiments hereof may provide different and/or other advantages, and that not all embodiments or implementations need have all advantages.

As used herein, including in the claims, the phrase "at least some" means "one or more," and includes the case of only one. Thus, e.g., the phrase "at least some ABCs" means "one or more ABCs," and includes the case of only one ABC.

As used herein, including in the claims, term "at least one" should be understood as meaning "one or more" and therefore includes both embodiments that include one or multiple components. Furthermore, dependent claims that refer to independent claims that describe features with "at least one" have the same meaning, both when the feature is referred to as "the" and "the at least one."

As used in this description, the term "portion" means some or all. For example, "A portion of X" may include some of "X" or all of "X." In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only," the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values, ranges, etc., in case these terms, features, values, ranges, etc., are used in conjunction with terms such as about, around, generally, substantially, essentially, at least, etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise," "including," "having," and "contain" and their variations should be understood as meaning "including but not limited to," and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance," "such as," "for example," ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A support assembly for use with a tow truck, the tow truck including a wheel lift and a cable guide configured with the wheel lift and including a through-hole, the support assembly comprising:
   an elongate member with a first end and a second end;
   a mount attached to the elongate member between the first end and the second end, the mount comprising a body adapted to be received into the through-hole;
   a first line attached to the first end and adapted to extend between the first end and an object resting on the wheel lift; and
   a second line attached to the second end and adapted to extend between the second end and the object resting on the wheel lift.

2. The support assembly of claim 1, wherein the mount's body includes a front end, a back end, and an opening extending between the front end and the back end.

3. The support assembly of claim 2, wherein the mount's body includes a side wall extending between the front end and the back end, the side wall including a slot that passes from outside the mount's body to the opening.

4. The support assembly of claim 3, wherein the slot extends from the front end to the back end.

5. The support assembly of claim 3, wherein the elongate member includes a front side and a back side each extending between the first end and the second end, and a cutout extending from the front side to the back side and adjacent the slot.

6. The support assembly of claim 5, wherein the elongate member includes a top and a bottom, and the cutout extends from the bottom towards the top.

7. The support assembly of claim 6, wherein the cutout extends perpendicular to the bottom.

8. The support assembly of claim 6, wherein the slot is aligned with the cutout.

9. The support assembly of claim 1, wherein the through-hole includes an inner diameter and the mount's body includes an outer diameter, wherein the outer diameter of the mount's body corresponds to the inner diameter of the through-hole.

10. The support assembly of claim 1, wherein the body of the mount is tubular.

11. The support assembly of claim 1, wherein a cross-section of the body of the mount is shaped as at least one of a circle, an oval, a triangle, a square, a rectangle, a pentagon, a hexagon, an octagon, a nonagon, and a decagon.

12. The support assembly of claim 1, wherein the mount is located at a position midway between the first end and the second end of the elongate member.

13. The support assembly of claim 1, wherein the mount extends perpendicularly away from the elongate member.

14. The support assembly of claim 1, wherein the first line and/or the second line includes a line length adjustment mechanism.

15. The support assembly of claim 1, wherein the first end is configured with a first hook and the first line is attached to the first hook, and/or the second end is configured with a second hook and the second line is attached to the second hook.

16. The support assembly of claim 1, wherein the first and/or second line includes at least one of a strap, webbing, a cable, a chain, and a rope.

17. The support assembly of claim 1, wherein the object includes a motorcycle including a left handlebar and a right handlebar, and the first line is attachable to the left handlebar and the second line is attachable to the right handlebar.

18. A support assembly for use with a tow truck, the tow truck including a front end and a wheel lift including an opening facing the front end, the support assembly comprising:
- an elongate member with a first end and a second end;
- a mount attached to the elongate member between the first end and the second end, the mount comprising a body adapted to be received into the opening;
- a first line attached to the first end and adapted to extend between the first end and an object resting on the wheel lift; and
- a second line attached to the second end and adapted to extend between the second end and the object resting on the wheel lift.

19. The support assembly of claim 18, wherein the object includes a motorcycle including a left handlebar and a right handlebar, and the first line is attachable to the left handlebar and the second line is attachable to the right handlebar.

\* \* \* \* \*